US010742090B2

(12) United States Patent
Koyama (10) Patent No.: US 10,742,090 B2
(45) Date of Patent: Aug. 11, 2020

(54) DECELERATING DEVICE FOR ELECTRIC MOTOR (71) Applicant: Honda Motor Co., Ltd., Tokyo (JP)

(72) Inventor: Shigeru Koyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 113 days.

(21) Appl. No.: 16/151,359

(22) Filed: Oct. 4, 2018

(65) Prior Publication Data

US 2019/0199166 A1 Jun. 27, 2019

(30) Foreign Application Priority Data

Dec. 27, 2017 (JP) ................ 2017-251921

(51) Int. Cl.
*H02K 7/116* (2006.01)
*B60K 17/04* (2006.01)
*B60W 20/40* (2016.01)
*H02K 7/106* (2006.01)

(52) U.S. Cl.
CPC ............ *H02K 7/116* (2013.01); *B60K 17/046* (2013.01); *B60W 20/40* (2013.01); *H02K 7/106* (2013.01)

(58) Field of Classification Search
CPC ...... H02K 7/116; H02K 7/106; B60K 17/046; B60W 20/40
See application file for complete search history.

(56) References Cited

U.S. PATENT DOCUMENTS

| 5,845,732 | A | * | 12/1998 | Taniguchi | ................ | B60K 1/00 180/65.6 |
| 6,255,751 | B1 | * | 7/2001 | Hoffmann | ............... | H02K 7/083 310/40 MM |
| 7,626,298 | B2 | * | 12/2009 | Atarashi | ................ | H02K 7/116 310/114 |
| 2007/0129198 | A1 | * | 6/2007 | Atarashi | .............. | H02K 21/029 475/5 |
| 2010/0125020 | A1 | * | 5/2010 | Ikegami | ................ | B60K 6/365 477/3 |
| 2012/0004063 | A1 | * | 1/2012 | Koyama | .................. | B60K 6/36 475/5 |
| 2012/0190491 | A1 | * | 7/2012 | Gunji | .................. | B60K 7/0007 475/5 |
| 2015/0367839 | A1 | * | 12/2015 | Murata | .................. | H02K 7/003 475/2 |

FOREIGN PATENT DOCUMENTS

JP 2015145708 8/2015

* cited by examiner

*Primary Examiner* — Mohamad A Musleh
(74) *Attorney, Agent, or Firm* — JCIPRNET (57) ABSTRACT

The decelerating device according to the disclosure includes first and second planetary gear mechanisms arranged in an inner space of a hollow type electric motor having an annular rotor. The first planetary gear mechanism includes a first ring gear integral with the rotor, a non-rotatable first carrier for supporting a first pinion gear engaged with the first ring gear to be rotatable, and a first sun gear engaged with the first pinion gear. The second planetary gear mechanism includes a second ring gear integral with the rotor, a second carrier supporting a second pinion gear engaged with the second ring gear to be rotatable and connected to the output shaft, and a second sun gear engaged with the second pinion gear and connected to the first sun gear.

6 Claims, 9 Drawing Sheets

DECELERATING DEVICE FOR ELECTRIC MOTOR

CROSS-REFERENCE TO RELATED APPLICATION

This application claims the priority of Japan patent application serial no. 2017-251921, filed on Dec. 27, 2017. The entirety of the above-mentioned patent application is hereby incorporated by reference herein and made a part of this specification.

BACKGROUND

Technical Field

The disclosure relates to a decelerating device for an electric motor for decelerating power of an electric motor.

Description of Related Art

Figure 9:
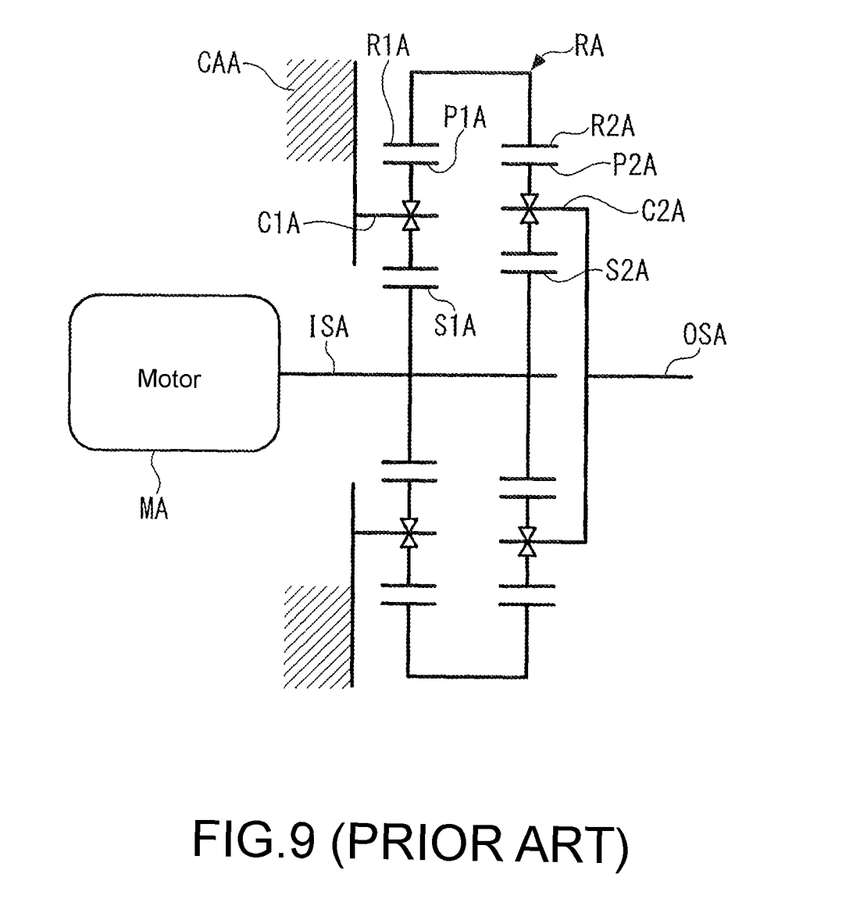
FIG. 9 is a diagram schematically showing a conventional decelerating device for an electric motor.

As a conventional decelerating device for an electric motor, the decelerating device disclosed in Patent Document 1 (Japanese Laid-Open No. 2015-145708), for example, is known. As shown in FIG. 9, this decelerating device for an electric motor (hereinafter referred to as "decelerating device") includes an input shaft ISA to which power of a motor MA is input, a first sun gear S1A which is directly connected to the input shaft ISA and a second sun gear S2A which is integral with the first sun gear S1A, a ring gear member RA which is arranged on outer circumferential sides of the first and second sun gears S1A and S2A and has a first ring gear R1A and a second ring gear R2A integral with each other, a first carrier C1A which supports a plurality of first pinion gears P1A engaged with the first sun gear S1A and the first ring gear R1A to be rotatable, and a second carrier C2A gear which supports a plurality of second pinion gears P2A engaged with the second sun gear S2A and the second ring gear R2A to be rotatable.

The first carrier C1A is non-rotatably fixed to a case CAA, and the second carrier C2A is directly connected to an output shaft OSA. The diameter of the first sun gear S1A is smaller than the diameter of the second sun gear S2A, and the diameters of the first and second ring gears R1A and R2A are equal to each other.

With the above configuration, the power of the motor MA is input via the input shaft ISA and is output from the output shaft OSA in a state of being decelerated at a predetermined decelerating ratio. This decelerating ratio is determined according to the gear ratio between the first sun gear S1A and the ring gear member RA and the gear ratio between the second sun gear S2A and the ring gear member RA.

As shown in FIG. 9, in the above-described conventional decelerating device, the motor MA is configured at the outside of a gear device formed by the first sun gear S1A or the like in the axial direction of the input/output shaft ISA, OSA. Therefore, the decelerating device is longer in the axial direction and cannot be configured to be compact.

In addition, in the decelerating device, the first sun gear S1A rotates in accordance with operation of the motor MA. Therefore, in order to lubricate the decelerating device, it is conceivable to dispose a lubricant passage inside the first sun gear S1A, for example, and supply a lubricant to the outside from the first sun gear S1A. However, in this case, since the first sun gear S1A is arranged in a vicinity of the axial center of the decelerating device, it is difficult to supply the lubricant by the centrifugal force. Thus, the lubricant cannot be supplied sufficiently and lubrication cannot be performed favorably.

SUMMARY

The disclosure provides a decelerating device 1 for an electric motor. The decelerating device 1 outputs power from an output shaft SO in a state in which power of the electric motor 2 is decelerated. The electric motor 2 is configured as a hollow type electric motor having an annular rotor 2b. In an inner space of the electric motor 2, a first planetary gear mechanism PG1 and a second planetary gear mechanism PG2 are arranged coaxially with the output shaft SO and parallel to each other in an axial direction. The first planetary gear mechanism PG1 includes: a first ring gear R1 which is disposed integrally to the rotor 2b of the electric motor 2; a first carrier C1 which is not rotatable and supports a first pinion gear P1 engaged with the first ring gear R1 to be rotatable; and a first sun gear S1 which is rotatable and engaged with the first pinion gear P1. The second planetary gear mechanism PG2 includes: a second ring gear R2 which is disposed integrally to the rotor 2b of the electric motor 2; a second carrier C2 which supports a second pinion gear P2 engaged with the second ring gear R2 to be rotatable and is connected to the output shaft SO; and a second sun gear S2 which is engaged with the second pinion gear P2 and connected to the first sun gear S1.

The disclosure provides a decelerating device 51 for an electric motor. The decelerating device 51 outputs power from an output shaft SO in a state in which power of the electric motor 2 is decelerated. The electric motor 2 is configured as a hollow type electric motor having an annular rotor 2b. In an inner space of the electric motor 2, a first planetary gear mechanism PG1 and a second planetary gear mechanism PG2 are arranged coaxially with the output shaft SO and parallel to each other in an axial direction. The first planetary gear mechanism PG1 includes a first ring gear R1 which is not rotatable; a first carrier C1 which supports a first pinion gear P1 engaged with the first ring gear R1 and a second pinion gear P2 engaged with the first pinion gear P1 to be rotatable and is disposed integrally to the rotor 2b of the electric motor 2; and a first sun gear S1 which is rotatable and engaged with the second pinion gear P2. The second planetary gear mechanism PG2 includes a second ring gear R2 which is disposed integrally to the rotor 2b of the electric motor 2; a third pinion gear P3 which is engaged with the second ring gear R2; a second carrier C2 which supports the third pinion gear P3 to be rotatable and is connected to the output shaft SO; and a second sun gear S2 which is engaged with the third pinion gear P3 and is connected to the first sun gear S1.

DESCRIPTION OF THE EMBODIMENTS

The disclosure provides a decelerating device for an electric motor. The decelerating device is capable of downsizing the entire device by reducing the length in the axial direction while ensuring a high decelerating ratio.

A first aspect of the disclosure provides a decelerating device 1 for an electric motor. The decelerating device 1 outputs power from an output shaft SO in a state in which power of the electric motor 2 is decelerated. The electric motor 2 is configured as a hollow type electric motor having an annular rotor 2b. In an inner space of the electric motor 2, a first planetary gear mechanism PG1 and a second planetary gear mechanism PG2 are arranged coaxially with the output shaft SO and parallel to each other in an axial direction. The first planetary gear mechanism PG1 includes: a first ring gear R1 which is disposed integrally to the rotor 2b of the electric motor 2; a first carrier C1 which is not rotatable and supports a first pinion gear P1 engaged with the first ring gear R1 to be rotatable; and a first sun gear S1 which is rotatable and engaged with the first pinion gear P1. The second planetary gear mechanism PG2 includes: a second ring gear R2 which is disposed integrally to the rotor 2b of the electric motor 2; a second carrier C2 which supports a second pinion gear P2 engaged with the second ring gear R2 to be rotatable and is connected to the output shaft SO; and a second sun gear S2 which is engaged with the second pinion gear P2 and connected to the first sun gear S1.

According to this configuration, when the electric motor operates and the rotor rotates, the power of the electric motor is directly input to the first ring gear integral with the rotor from the rotor. The input power is decelerated by the first and second planetary gear mechanisms having the above-described configuration at the predetermined high decelerating ratio, and is then output from the output shaft connected to the second carrier. In this way, the high decelerating ratio is ensured.

Further, according to the disclosure, the electric motor is configured as a hollow type electric motor, the first ring gear of the first planetary gear mechanism and the second ring gear of the second planetary gear mechanism are disposed integrally to the rotor of the electric motor, and the first and second planetary gear mechanisms are arranged in the inner space of the electric motor. As a result, compared with the conventional decelerating device in which the motor and the decelerating device are arranged in parallel in the axial direction, the length in the axial direction can be reduced, as the decelerating device is almost accommodated in the inner space of the electric motor, and the entire device can thus be downsized.

According to a second aspect of the disclosure, the decelerating device for the electric motor of the first aspect further includes a torque limiter 31 serving to limit a torque of the first carrier C1 to a predetermined value or lower.

In the configuration of the first aspect, since the first carrier is configured to be non-rotatable, it is possible that an excessive torque is generated in the first carrier, depending on the magnitude of the power of the electric motor and the reaction force from the output side of the decelerating device for the electric motor. According to this configuration, since the torque limiter limits the torque of the first carrier to be equal to or lower than the predetermined value, the occurrence of an excessive torque in the first carrier can be avoided. Further, since the torque limitation is not exerted by the torque limiter until the torque of the first carrier reaches the predetermined value, the first carrier is maintained in the non-rotatable state and smoothly exerts the original function.

A third aspect of the disclosure provides a decelerating device 51 for an electric motor. The decelerating device 51 outputs power from an output shaft SO in a state in which power of the electric motor 2 is decelerated. The electric motor 2 is configured as a hollow type electric motor having an annular rotor 2b. In an inner space of the electric motor 2, a first planetary gear mechanism PG1 and a second planetary gear mechanism PG2 are arranged coaxially with the output shaft SO and parallel to each other in an axial direction. The first planetary gear mechanism PG1 includes a first ring gear R1 which is not rotatable; a first carrier C1 which supports a first pinion gear P1 engaged with the first ring gear R1 and a second pinion gear P2 engaged with the first pinion gear P1 to be rotatable and is disposed integrally to the rotor 2b of the electric motor 2; and a first sun gear S1 which is rotatable and engaged with the second pinion gear P2. The second planetary gear mechanism PG2 includes a second ring gear R2 which is disposed integrally to the rotor 2b of the electric motor 2; a third pinion gear P3 which is engaged with the second ring gear R2; a second carrier C2 which supports the third pinion gear P3 to be rotatable and is connected to the output shaft SO; and a second sun gear S2 which is engaged with the third pinion gear P3 and is connected to the first sun gear S1.

In this configuration, the first planetary gear mechanism is of a double pinion type and has the first and second pinion gears, and the second planetary gear mechanism is of a single pinion type and has the third pinion gear. According to this configuration, when the electric motor operates and the rotor rotates, the power of the electric motor is input from the rotor to the first carrier integral with the rotor. The input power is decelerated by the first and second planetary gear mechanisms having the above-described configuration at a predetermined large decelerating ratio, and then output from the output shaft connected to the second carrier. In this way, like the first aspect of the disclosure, the high decelerating ratio is ensured.

Further, according to the third aspect, like the first aspect of the disclosure, the electric motor is configured as a hollow type electric motor, and the first and second planetary gear mechanisms are arranged in the inner space of the electric motor. In this way, since the decelerating device is almost accommodated in the inner space of the electric motor, the length in the axial direction can be reduced and the entire device can be downsized.

According to a fourth aspect of the disclosure, in the decelerating device for the electric motor of the third aspect, the first carrier C1 has a spindle (the first spindle 52, the second spindle 53) supporting the first pinion gear P1 and the second pinion gear P2 to be rotatable, and the spindle is formed with a lubricant passage 58 into which a lubricant is introduced and a discharge hole 59 which communicates with the lubricant passage 58, the discharge hole 59 is opened to an outer circumferential surface, and discharges the lubricant to an outside of the spindle.

In the configuration of the third aspect, the first carrier rotates in accordance with operation of the electric motor. Also, unlike the first sun gear, the first carrier is disposed at a position away from the axis center, so a large centrifugal force acts on the first carrier. According to the configuration of the fourth aspect, since the lubricant passage and the discharge hole are formed in the spindle of the first carrier, the lubricant introduced into the lubricant passage is discharged from the discharge hole to the outside of the spindle by a large centrifugal force acting on the first carrier. As a result, the lubricant can be supplied to components in a wide range, including the first and second pinion gears and the supporting parts thereof, and these components can be efficiently and favorably lubricated.

According to a fifth aspect of the disclosure, the decelerating device for the electric motor of the third or fourth aspect further includes a torque limiter 61 serving to limit a torque of the first ring gear R1 to a predetermined value or lower.

In the configuration of the third or fourth aspect, since the first ring gear is configured to be non-rotatable, it is possible that an excessive torque is generated in the first ring gear, depending on the magnitude of the power of the electric motor and the reaction force from the output side of the decelerating device for the electric motor. According to this configuration, since the torque of the first ring gear is limited to the predetermined value or lower by the torque limiter, the occurrence of an excessive torque in the first ring gear can be avoided. Since the torque limitation is not exerted by the torque limiter until the torque of the first ring gear reaches the predetermined value, the first ring gear is maintained in the non-rotatable state and smoothly exerts the original function.

Figure 1:
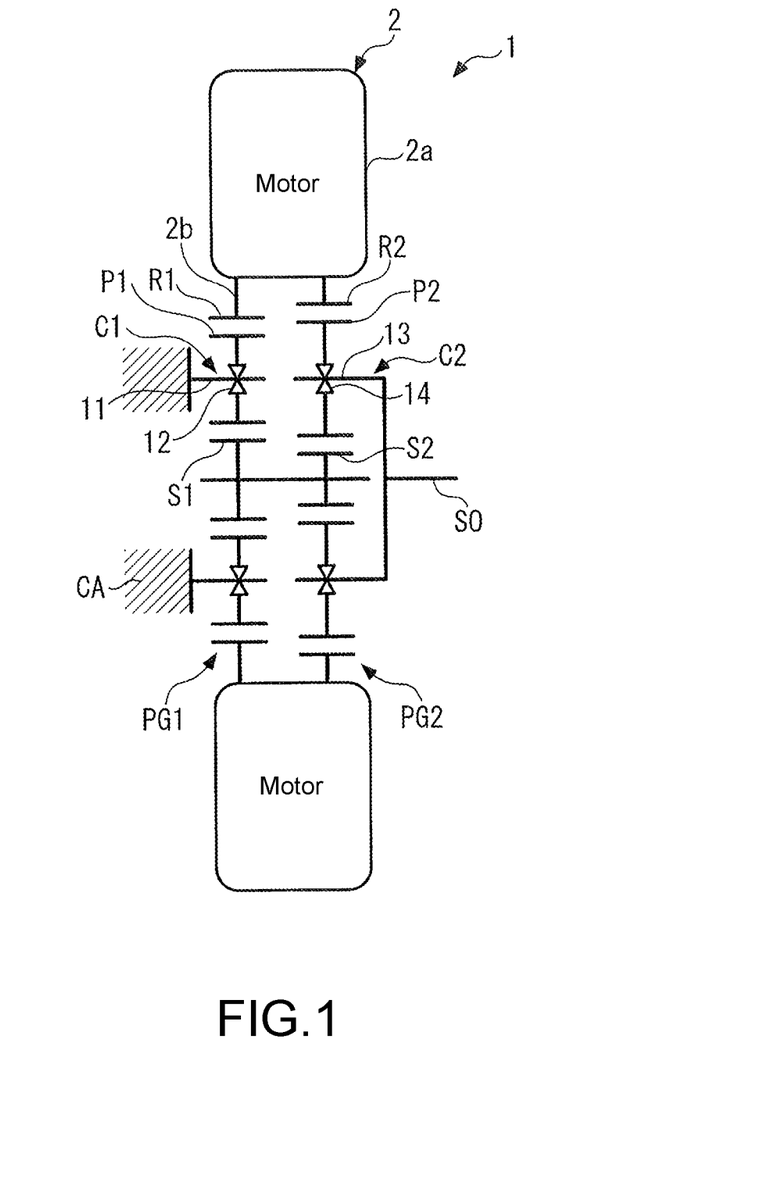
FIG. 1 is a diagram schematically showing a decelerating device for an electric motor according to a first embodiment of the disclosure.
Figure 3:
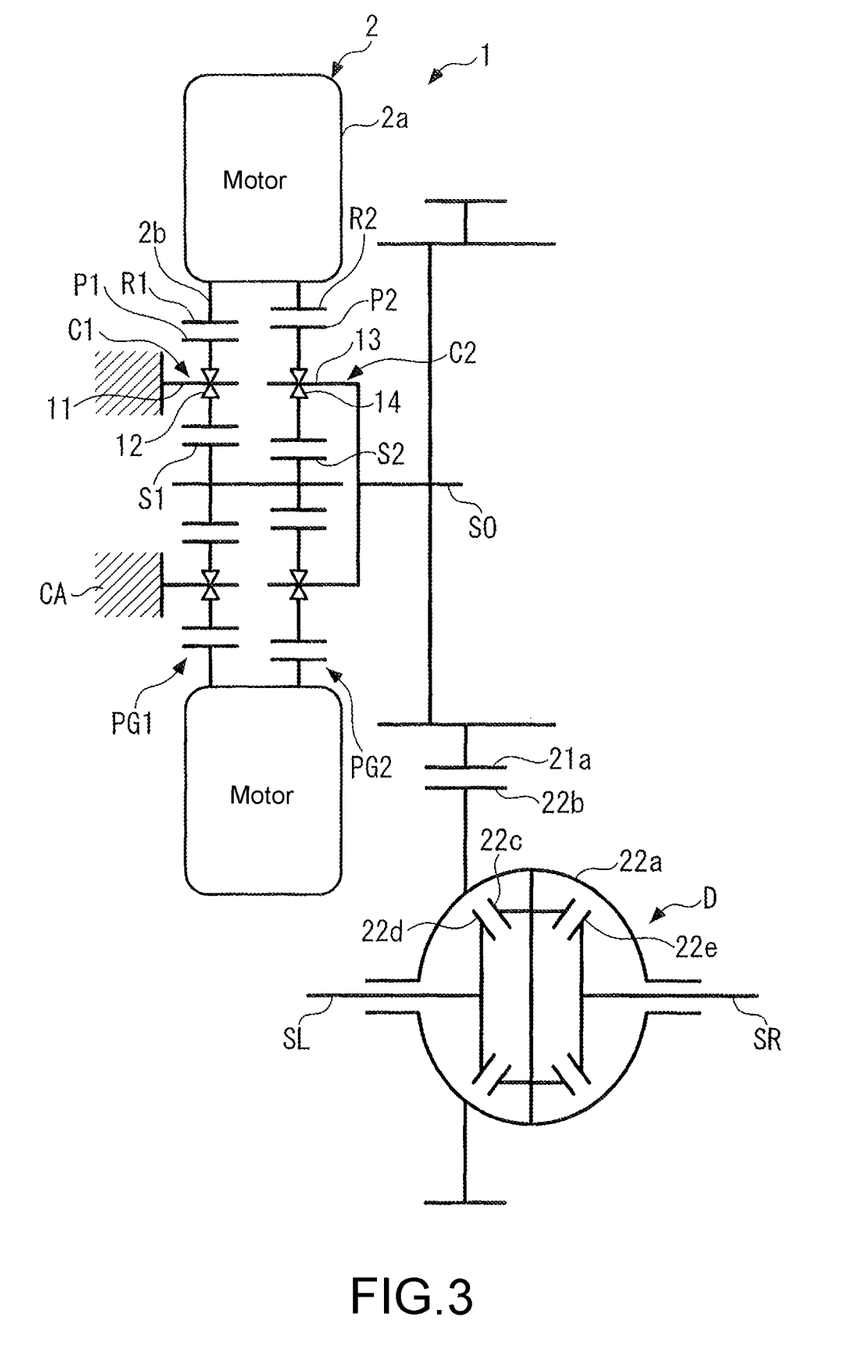
FIG. 3 is a diagram schematically showing a state in which the decelerating device for electric motor of FIG. 1 is connected to a differential device.

Hereinafter, exemplary embodiments of the disclosure will be described in detail with reference to the drawings. As shown in FIG. 1, a decelerating device 1 for an electric motor (hereinafter referred to as "decelerating device") according to a first embodiment of the disclosure is a device to which power of an electric motor 2 (hereinafter referred to as "motor") mounted to a four-wheeled vehicle (not shown), for example, to serve as a power source is input, and which decelerates the input power at a predetermined decelerating ratio and outputs the decelerated power from an output shaft SO. As shown in FIG. 3, the output shaft SO is connected to a differential device D, and the differential device D is connected to left and right driving shafts SL and SR.

The motor 2 is constituted of a so-called flat hollow type electric motor, and has a large inner space at the inner side in the radial direction. The motor 2 is arranged coaxially with the output shaft SO of the decelerating device 1 and has an annular casing 2a, a stator (not shown), and a rotor 2b. The stator is composed of a plurality of iron cores, coils, etc., and is fixed to the casing 2a. The rotor 2b is constituted of a plurality of magnets, etc., and is disposed to face the stator and is driven to rotate by supplying electric power to the stator.

The decelerating device 1 includes a first planetary gear mechanism PG1 and a second planetary gear mechanism PG2. The first and second planetary gear mechanisms PG1 and PG2 are accommodated in the inner space of the motor 2, and are arranged coaxially with the output shaft SO and parallel to each other in the axial direction of the output shaft SO (hereinafter referred to as "axial direction").

The first planetary gear mechanism PG1 is of a single pinion type and is composed of a first ring gear R1, a first carrier C1, a plurality of first pinion gears P1, and a first sun gear S1, etc.

The first ring gear R1 is disposed integrally to the rotor 2b of the motor 2. The first carrier C1 has a plurality (four, for example, but only two of them are shown) of spindles 11 that are integrally disposed. These spindles 11 are arranged to be equally spaced from each other in the circumferential direction, and an end of each of the spindles 11 is fixed to an immovable case CA and extends in the axial direction. Each of the plurality of first pinion gears P1 (only two are shown) is supported to be rotatable on the spindle 11 via a bearing 12 and is engaged with the first ring gear R1. Further, the first sun gear S1 is arranged coaxially with the output shaft SO, is supported to be rotatable via a bearing (not shown), and is engaged with the first pinion gears P1.

The second planetary gear mechanism PG2 is also of the single pinion type and is constituted of a second ring gear R2, a second carrier C2, a plurality of second pinion gears P2, and a second sun gear S2, etc.

The second ring gear R2 is disposed integrally to the rotor 2b of the motor 2. The second carrier C2 has a plurality of (four, for example) spindles 13. These spindles 13 are arranged to be equally spaced from each other in the circumferential direction and respectively extend in the axial direction. Each of the second pinion gears P2 is supported to be rotatable on the spindle 13 via a bearing 14 and is engaged with the second ring gear R2. Further, the second sun gear S2 is arranged coaxially with the output shaft SO, is connected to the first sun gear S1, and is engaged with the second pinion gears P2.

As shown in FIG. 1, the diameter (pitch circle diameter) and the teeth number of the first sun gear S1 are greater than those of the second sun gear S2, and the diameter and the teeth number of the first ring gear R1 are smaller than those of the second ring gear R2. As a result, a ratio γ1 (=ZR1/ZS1, hereinafter referred to as "first teeth number ratio") between a teeth number ZR1 of the first ring gear R1 and a teeth number ZS1 of the first sun gear S1 is smaller than a ratio γ2 (=ZR2/ZS2, hereinafter referred to as "second teeth number ratio") between a teeth number ZR2 of the second ring gear R2 and a teeth number ZS2 of the second sun gear S2.

According to the above configuration, the rotation speeds of the respective rotation elements and the relationship of rotation speeds among the rotation elements in the decelerating device 1 are as follows. First, since the first carrier C1 is fixed to the case CA via the spindle 11, the rotation speed of the first carrier C1 is constantly zero. In addition, since the first and second ring gears R1 and R2 are disposed integrally to the rotor 2b of the motor 2, the rotation speeds of the three elements, which are R1, R2, and 2b, are equal to each other. Since the first and second sun gears S1 and S2 are connected to each other, the rotation speeds of the two elements, which are S1 and S2, are equal to each other. Since the second carrier C2 and the output shaft SO are connected to each other, the rotation speeds of the two elements, i.e. C2 and SO, are equal to each other.

Figure 2:
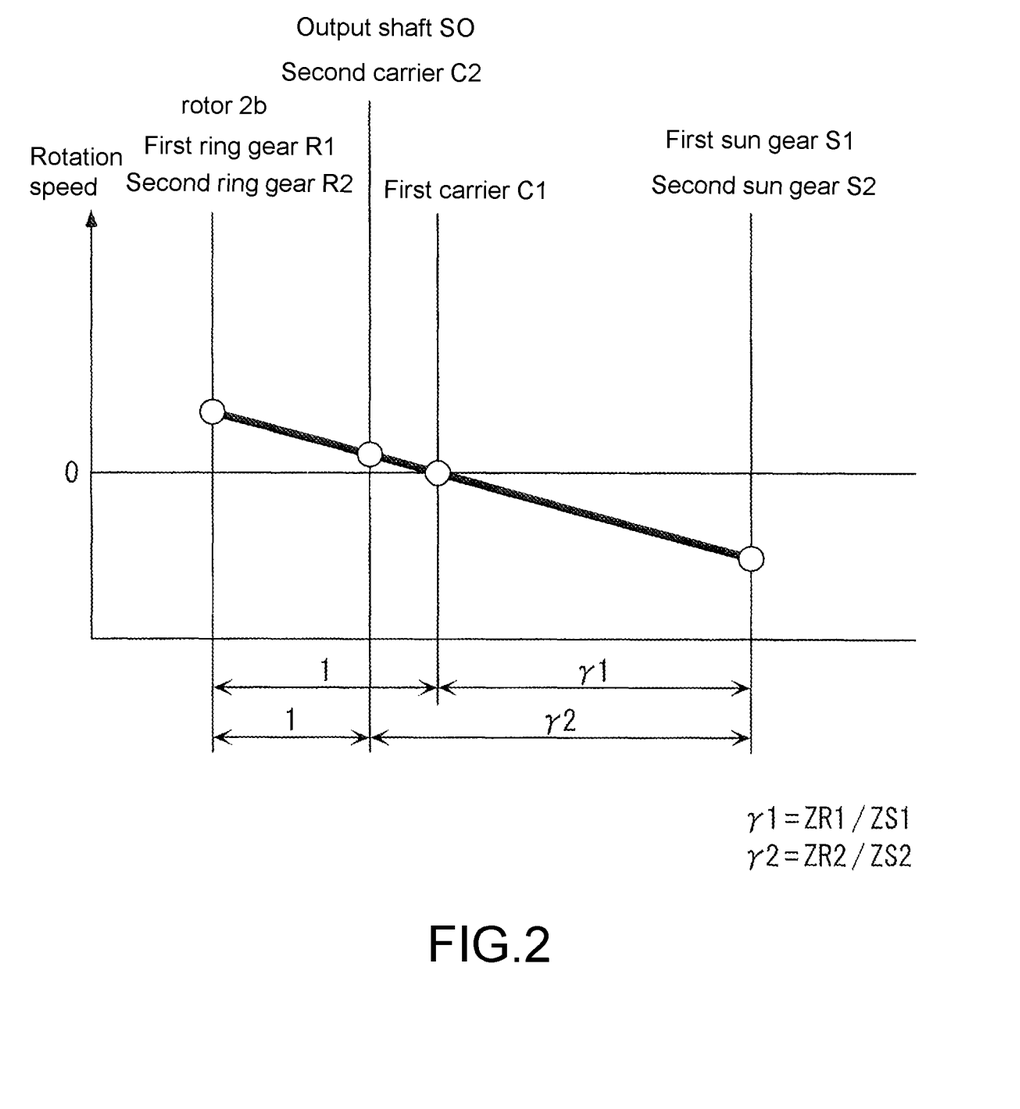
FIG. 2 is a collinear chart showing a relationship of rotation speeds among rotation elements in the decelerating device for the electric motor of FIG. 1.

Also, since the first and second planetary gear mechanisms PG1 and PG2 are of the single pinion type, the relationship of rotation speeds among the rotation elements during operation of the motor 2 is represented as the collinear chart of FIG. 2, for example. That is, the first ring gear R1 (the second ring gear R2), the second carrier C2, the first carrier C1, and the first sun gear S1 (the second sun gear S2) constitute four rotation elements. In the figure, γ1 is the first teeth number ratio, and γ2 is the second teeth number ratio.

A speed ratio RD (a ratio between the rotation speed of the output shaft SO and the rotation speed of the motor 2) of the decelerating device 1 is represented by the following equation (1) using the first and second teeth number ratios γ1 and γ2.

$$RD=1-\{(1+\gamma1)/(1+\gamma2)\} \quad (1)$$

As shown in this equation (1) and FIG. 2, as the first teeth number ratio γ1 (=ZR1/ZS1) and the second teeth number ratio γ2 (=ZR2/ZS2) are closer to each other, the speed ratio RD approaches the value zero, and a high decelerating ratio can be ensured.

As mentioned above, the decelerating device 1 is connected to the differential device D. Hereinafter, this configuration will be described with reference to FIG. 3. An output member 21 is coaxially connected to the output shaft SO, and an output gear 21a is disposed integrally to the outer circumferential part of the output member 21.

The differential device D is constituted of a general differential gear, and has a rotatable differential case 22a, a plurality of pinion gears 22c disposed integrally to the differential case 22a, and left and right side gears 22d and 22e engaged with the pinion gears 22c, etc. In the differential case 22a, an input gear 22b engaged with the output gear 21a is disposed integrally. The left and right side gears 22d and 22e are respectively connected to the left driving shaft SL and the right driving shaft SR, and the left driving shaft SL and the right driving shaft SR are further connected to left and right driving wheels (not shown).

With the above configuration, in a state of being decelerated by the decelerating device 1, the power of the motor 2 is output from the output shaft SO, and is further transmitted to the differential device D via the output gear 21a and the input gear 22b and then further distributed to the left and right driving wheels by the differential device D via the left driving shaft SL and the right driving shaft SR.

As described above, according to the decelerating device 1 for the electric motor of this embodiment, a high decelerating ratio can be ensured by decelerating the power of the motor 2 input from the first ring gear R1 with the first and second planetary gear mechanisms PG1 and PG2. For this reason, even if the decelerating device 1 is connected to the differential device D as in this embodiment, only a pair of the output gear 21a and the input gear 22b between the decelerating device 1 and the differential device D are required, and it is not necessary to additionally dispose a decelerating gear. Therefore, for obtaining a high decelerating ratio, the required number of parts can be reduced as compared with the case where deceleration is performed in a plurality of stages by using a plurality of decelerating gear pairs.

In addition, the first ring gear R1 and the second ring gear R2 are disposed integrally to the rotor 2b of the hollow type motor 2, and the first and second planetary gear mechanisms PG1 and PG2 are accommodated in the inner space of the motor 2. Therefore, compared with the conventional decelerating device where the motor and the decelerating device are disposed in parallel in the axial direction, the length in the axial direction can be reduced, and the entire device can be downsized.

Figure 4:
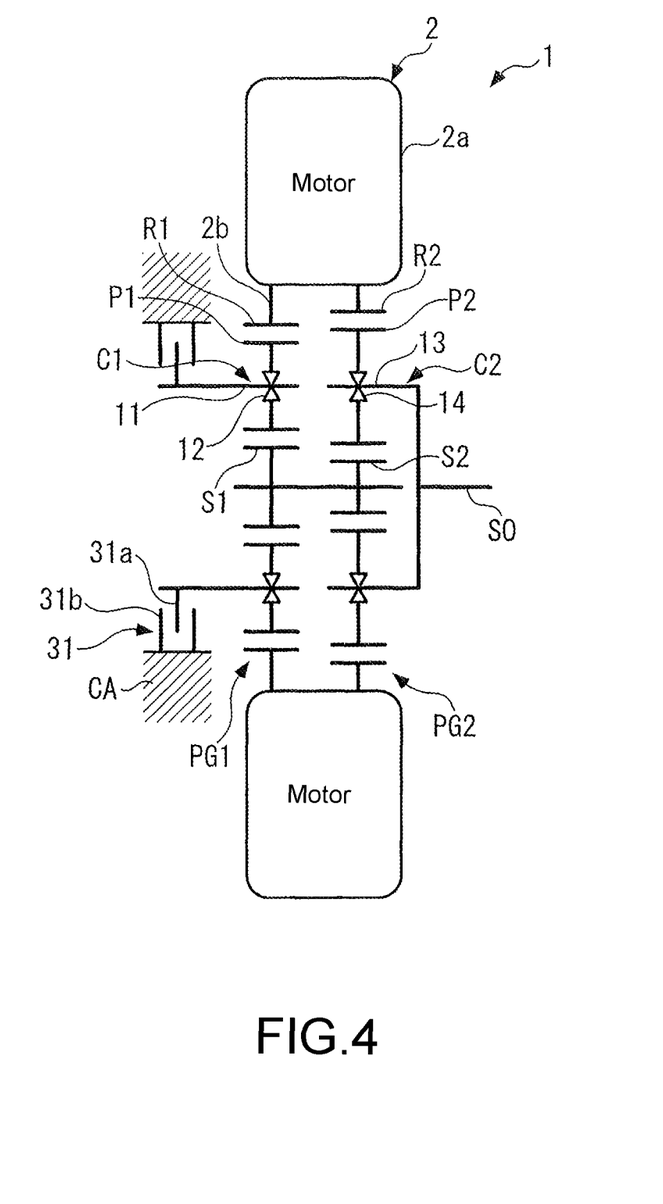
FIG. 4 is a diagram schematically showing a decelerating device for an electric motor according to a modified example of the first embodiment.

Next, a modified example of the above-described first embodiment will be described with reference to FIG. 4. As apparent from comparing with FIG. 1, this modified example is obtained by adding a torque limiter 31 to the decelerating device 1 of the first embodiment.

The torque limiter 31 serves to limit the torque generated in the first carrier C1. The torque limiter 31 includes an annular extending part 31a extending radially outward from an end of the spindle 11 of the first carrier C1 toward the side of the case CA, an annular pair of holders 31b, 31b which extend on two sides of the extending part 31a and of which one end is fixed to the case CA, an annular friction member (not shown) disposed between the extending part 31a and the holder 31b, and an annular leaf spring (not shown) disposed between the holder 31b and the friction member for pressing the friction member against the extending part 31a. The pressing load of this leaf spring is set so as to exceed the frictional force between the extending part 31a and the friction member when the torque of the first carrier C1 (hereinafter referred to as "carrier torque") is at a predetermined value.

With the above configuration, when the carrier torque reaches the predetermined value, the extending part 31a slides with respect to the friction member, so that the carrier torque does not increase any further and is limited to the predetermined value or less. Accordingly, the occurrence of an excessive torque in the first carrier C1 and the adverse effect caused by the excessive torque are avoided. Also, until the carrier torque reaches the predetermined value, the integrity of the extending part 31a with respect to the friction member and the holder 31b is maintained, and the first carrier C1 is maintained in a non-rotatable state and smoothly exerts its original function.

Next, with reference to FIGS. 5 to 7, a decelerating device 51 for an electric motor according to a second embodiment of the disclosure will be described. Compared to the decelerating device 1 of the first embodiment, the decelerating device 51 has a double pinion type first planetary gear mechanism PG1, the rotor 2b of the motor 2 is connected to the first carrier C1, and the first ring gear RI is fixed, while the rest of the configuration is basically the same. Therefore, components the same as or similar to those of the first embodiment are denoted by the same reference numerals, and the configuration of the decelerating device 51 will be described below emphasizing the difference from the first embodiment. While it is not shown in the drawings, the decelerating device 51 is connected to the differential device D like the decelerating device 1.

The first planetary gear mechanism PG1 is of the double pinion type, and is constituted of the first ring gear R1, the first carrier C1, the first pinion gears P1, the second pinion gears P2, and the first sun gear S1, etc.

The first ring gear R1 is fixed to the immovable case CA. The first carrier C1 has a plurality of (four, for example) integrally disposed first spindles 52 and second spindles 53 (only two are shown for each of first and second spindles). These first spindles 52 are arranged at predetermined positions on the outer side in the radial direction and equally spaced in the circumferential direction, and extend in the axial direction. The second spindles 53 are disposed at predetermined positions at the inner side with respect to the first spindles 52 and equally spaced in the circumferential direction, and extend in the axial direction. The first carrier C1 is disposed integrally to the rotor 2b of the motor 2.

Each of the plurality of first pinion gears P1 (only two are shown) is supported to be rotatable on the first spindle 52 via a bearing 54 and is engaged with the first ring gear R1. Each of the plurality of second pinion gears P2 (only two are shown) is supported to be rotatable on the second spindle 52 via a bearing 55 and is engaged with the first pinion gear P1. Further, the first sun gear S1 is arranged coaxially with the output shaft SO, supported to be rotatable via a bearing (not shown), and engaged with the second pinion gears P2.

The second planetary gear mechanism PG2 is of the single pinion type and has the same configuration as in the first embodiment. Since the pinion gears on the inner side and the outer side of the first planetary gear mechanism PG1 are referred to as the first and second pinion gears P1 and P2, the symbol of the pinion gears of the second planetary gear mechanism PG2 in FIG. 5 is set as "P3" in the sense of the third pinion gears.

Figure 5:
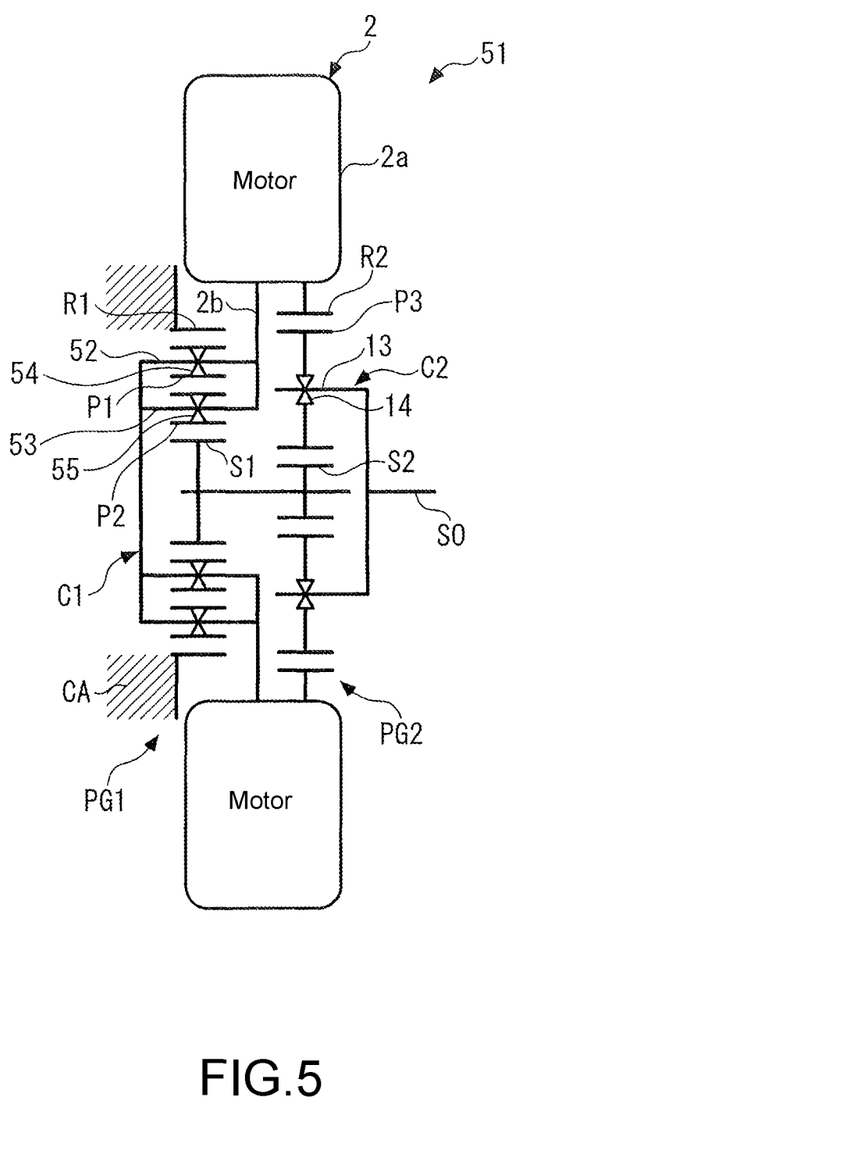
FIG. 5 is a diagram schematically showing a decelerating device for an electric motor according to a second embodiment of the disclosure.

As shown in FIG. 5, the diameter and the teeth number of the first sun gear S1 are greater than those of the second sun gear S2, and the diameter and the teeth number of the first ring gear R1 are smaller than those of the second ring gear R2. As a result, the first teeth number ratio γ1 (=ZR1/ZS1), which is the ratio between the teeth number ZR1 of the first ring gear R1 and the teeth number ZS1 of the first sun gear S1, is smaller than the second teeth number ratio γ2 (=ZR2/ZS2), which is the ratio between the teeth number ZR2 of the second ring gear R2 and the teeth number ZS2 of the second sun gear S2.

From the above configuration, the first ring gear R1 is fixed to the case CA, and the rotation speed of the first ring gear R1 is constantly zero. The first carrier C1 and the second ring gear R2 are disposed integrally to the rotor 2*b* of the motor 2, and the rotation speeds of the three elements, which are C1, R2, and 2*b*, are equal to each other. The rotation speeds of other rotation elements and the relationship of rotation speeds among the rotation elements are the same as those in the first embodiment, that is, the rotation speeds of the first and second sun gears S1 and S2 connected to each other are equal, and the rotation speeds of the second carrier C2 and the output shaft SO connected to each other are equal.

Figure 6:
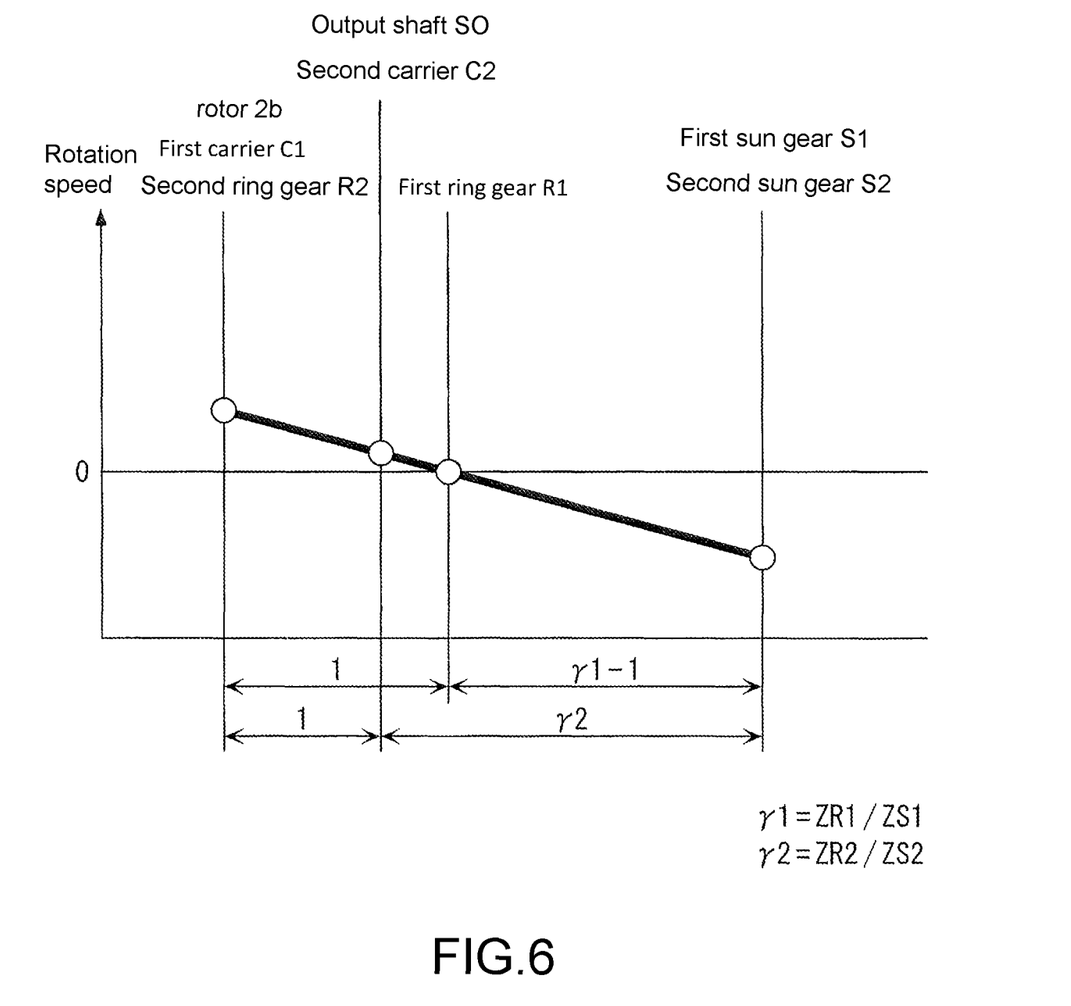
FIG. 6 is a collinear chart showing a relationship of rotation speeds among rotation elements in the decelerating device for the electric motor of FIG. 5.

In addition, since the first planetary gear mechanism PG1 is of the double pinion type and the second planetary gear mechanism PG2 is of the single pinion type, the relationship of rotation speeds among the rotation elements during operation of the motor 2 is represented as a collinear chart in FIG. 6, for example. That is, the first carrier C1 (the second ring gear R2), the second carrier C2, the first ring gear R1, and the first sun gear S1 (the second sun gear S2) constitute four rotation elements.

Further, the speed ratio RD (the ratio between the rotation speed of the output shaft SO and the rotation speed of the motor 2) of the decelerating device 51 is represented by the following equation (2) using the first and second teeth number ratios γ1 and γ2.

$$RD=1-\{1/(1+\gamma 2)\} \quad (2)$$

As shown in this equation (2) and FIG. 6, as the first teeth number ratio γ1 (=ZR1/ZS1) and the second teeth number ratio γ2 (=ZR2/ZS2) are closer to each other, the speed ratio RD becomes smaller and a high decelerating ratio can be ensured.

As described above, according to the decelerating device 51 for the electric motor of the this embodiment, a high decelerating ratio can be ensured by decelerating the power of the motor 2 input from the first carrier C1 with the first and second planetary gear mechanisms PG1 and PG2. Therefore, in the case where the decelerating device 51 is connected to the differential device D, it is not necessary to add a decelerating gear between the decelerating device 51 and the differential device D. In this way, the number of parts can be reduced. Also, like the first embodiment, since the first and second planetary gear mechanisms PG1 and PG2 are accommodated in the inner space of the motor 2, the length in the axial direction can be reduced, and the entire device can be downsized.

Figure 7:
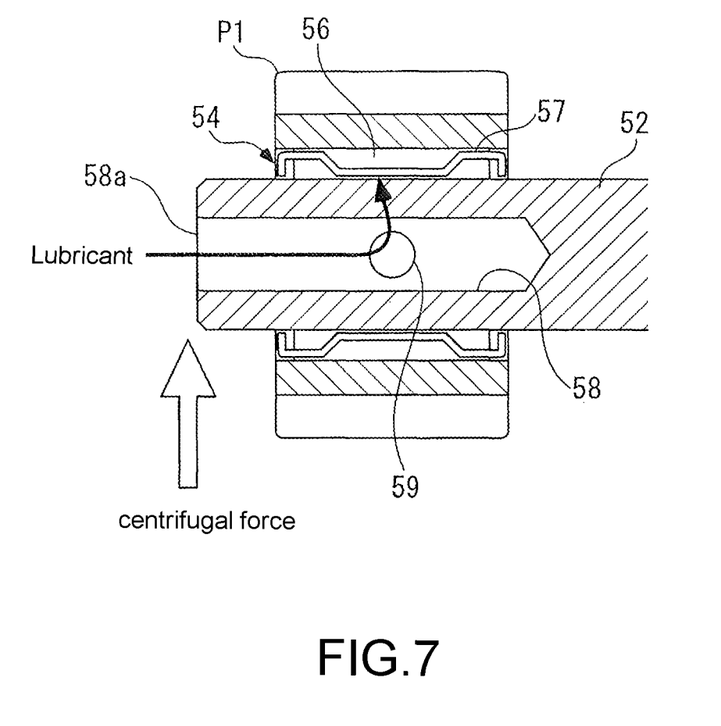
FIG. 7 is a cross-sectional view partially showing a configuration of a support part of a first carrier in the decelerating device for the electric motor of FIG. 5.

FIG. 7 shows a configuration for lubricating the decelerating device 51, and the configuration is disposed to the spindle 52 of the first carrier C1 that supports the first pinion gear P1 via the bearing 54. The bearing 54 has multiple rollers 56 arranged in the circumferential direction and a holder 57 for holding the rollers 56 at predetermined positions.

In the first spindle 52, a lubricant passage 58 and a discharge hole 59 are formed. The lubricant passage 58 has an opening 58*a* at an end of the first spindle 52 and extends concentrically along the first spindle 52, and the lubricant is introduced into the lubricant passage 58 via the opening 58*a*. The discharge hole 59 communicates with the lubricant passage 58 and is opened to the outer circumferential surface of the spindle 52 at the position of the bearing 54.

According to the above configuration, as the motor 2 operates, the lubricant introduced into the lubricant passage 58 is discharged from the discharge hole 59 to the outside of the first spindle 52 by a large centrifugal force acting on the first carrier C1. Accordingly, the lubricant can be supplied to components in a wide range, including the bearing 54 and the first pinion gear P1, and the lubrication can be efficiently and favorably performed.

Figure 8:
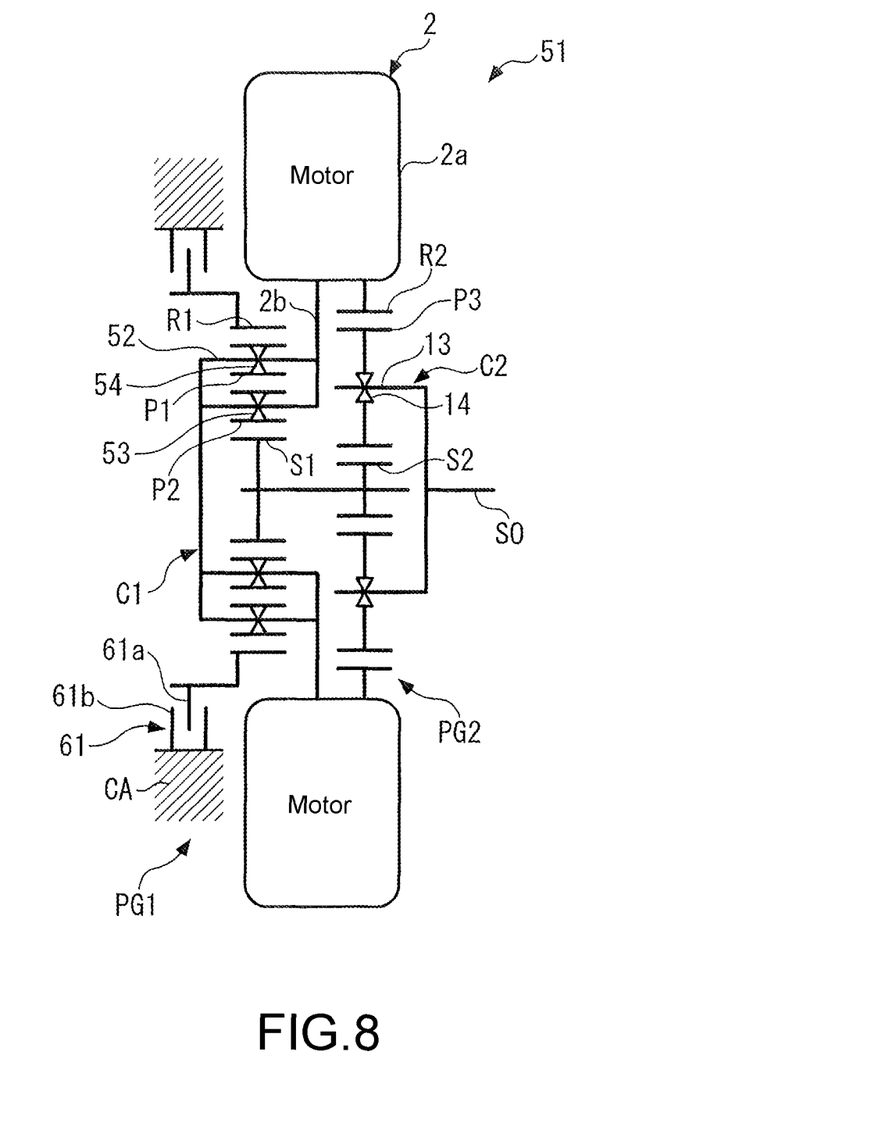
FIG. 8 is a diagram schematically showing a decelerating device for an electric motor according to a modified example of the second embodiment.

Next, a modified example of the above-described second embodiment will be described with reference to FIG. 8. As apparent from comparing with FIG. 5, in this modified example, a torque limiter 61 is added to the decelerating device 51 of the second embodiment.

This torque limiter 61 serves to limit the torque generated in the first ring gear R1, and the configuration of the torque limiter 61 is basically the same as the torque limiter 31 in the modified example of the first embodiment. Specifically, the torque limiter 61 includes an annular extending part 61*a* extending radially outward from the first ring gear R1 toward the side of the case CA and an annular pair of holders 61*b*, 61*b* which extend on two sides of the extending part 61*a* and of which one end is fixed to the case CA, and the torque limiter 61 also has an annular friction member (not shown), a leaf spring (not shown), etc. configured similarly to those of the torque limiter 31. The pressing load of this leaf spring is set so as to exceed the frictional force between the extending part 61*a* and the friction member when the torque of the first ring gear R1 (hereinafter referred to as "ring gear torque") is at a predetermined value.

With the above configuration, when the ring gear torque reaches the predetermined value, the extending part 61*a* slides with respect to the friction member, so that the ring gear torque does not increase any further and is limited to the predetermined value or less. Accordingly, the occurrence of an excessive torque in the first ring gear R1 and the adverse effect caused by the excessive torque can be avoided. Also, until the ring gear torque reaches the predetermined value, the integrity of the extending part 61*a* with respect to the friction member and the holder 61*b* is maintained, and the first ring gear R1 is maintained in a non-rotatable state and smoothly exerts its original function.

It should be noted that the disclosure is not limited to the embodiments described above, and can be implemented in various modes. For example, while the torque limiters 31 and 61 for limiting the torques of the first carrier C1 and the first ring gear R1 in the embodiments adopt a friction type in which a friction member, a leaf spring, etc. is used, any other suitable types of torque limiter can be used as long as the generated torque can be limited to the predetermined value or less.

Further, in the second embodiment, the configuration, such as the lubricant passage 58, for lubricating the decelerating device 51 is applied to the first spindle 52 of the first carrier C1, but the configuration may be additionally or alternatively applied to the second spindle 53.

Further, in the embodiments, the decelerating devices 1 and 51 are used for the motor 2 serving as the power source of the vehicle and are connected to the differential device D. However, the disclosure is not limited thereto and can be widely applied for other purposes. Besides, within the scope of the spirit of the disclosure, it is possible to adjust or modify the configuration of detailed parts appropriately.

What is claimed is:

1. A decelerating device for an electric motor,
the decelerating device outputting power from an output shaft in a state in which power of the electric motor is decelerated,
the electric motor being configured as a hollow type electric motor having an annular rotor,
in an inner space of the electric motor, a first planetary gear mechanism and a second planetary gear mechanism being arranged coaxially with the output shaft and parallel to each other in an axial direction, wherein
the first planetary gear mechanism comprises:
a first ring gear which is disposed integrally to the rotor of the electric motor;
a first carrier which is not rotatable and supports a first pinion gear engaged with the first ring gear to be rotatable; and
a first sun gear which is rotatable and engaged with the first pinion gear, and the second planetary gear mechanism comprises:
a second ring gear which is disposed integrally to the rotor of the electric motor;
a second carrier which supports a second pinion gear engaged with the second ring gear to be rotatable and is connected to the output shaft; and
a second sun gear which is engaged with the second pinion gear and connected to the first sun gear.

2. The decelerating device for the electric motor according to claim 1, further comprising a torque limiter serving to limit a torque of the first carrier to a predetermined value or lower.

3. A decelerating device for an electric motor,
the decelerating device outputting power from an output shaft in a state in which power of the electric motor is decelerated,
the electric motor being configured as a hollow type electric motor having an annular rotor,
in an inner space of the electric motor, a first planetary gear mechanism and a second planetary gear mechanism being arranged coaxially with the output shaft and parallel to each other in an axial direction, wherein
the first planetary gear mechanism comprises:
a first ring gear which is not rotatable;
a first carrier which supports a first pinion gear engaged with the first ring gear and a second pinion gear engaged with the first pinion gear to be rotatable and is disposed integrally to the rotor of the electric motor; and
a first sun gear which is rotatable and engaged with the second pinion gear, and the second planetary gear mechanism comprises:
a second ring gear which is disposed integrally to the rotor of the electric motor;
a third pinion gear which is engaged with the second ring gear;
a second carrier which supports the third pinion gear to be rotatable and is connected to the output shaft; and
a second sun gear which is engaged with the third pinion gear and is connected to the first sun gear.

4. The decelerating device for the electric motor according to claim 3, wherein the first carrier has a spindle supporting the first pinion gear and the second pinion gear to be rotatable, and the spindle is formed with a lubricant passage into which a lubricant is introduced and a discharge hole which communicates with the lubricant passage, the discharge hole is opened to an outer circumferential surface and discharges the lubricant to an outside of the spindle.

5. The decelerating device for the electric motor according to claim 4, further comprising a torque limiter serving to limit a torque of the first ring gear to a predetermined value or lower.

6. The decelerating device for the electric motor according to claim 3, further comprising a torque limiter serving to limit a torque of the first ring gear to a predetermined value or lower.

* * * * *